US000001239H

United States Statutory Invention Registration [19]

[11] Reg. Number: H1239

Dusek

[43] Published: Oct. 5, 1993

[54] EXTRUSION OF METAL OXIDE SUPERCONDUCTING WIRE, TUBE OR RIBBON

[75] Inventor: Joseph T. Dusek, Lombard, Ill.

[73] Assignee: The United States of America as represented by the United States Department of Energy, Washington, D.C.

[21] Appl. No.: 571,400

[22] Filed: Aug. 23, 1990

[51] Int. Cl.[5] ..... C04B 35/64

[52] U.S. Cl. ..... 264/63; 505/704; 505/740; 505/780; 427/62; 264/66; 264/177.1; 264/211.11

[58] Field of Search ..... 264/56, 63, 65, 66, 264/104, 177.11, 177.1, 211.11, 211.12; 505/704, 739, 740, 780, 813, 884, 886, 887, 1; 425/133.1; 427/62

[56] References Cited

U.S. PATENT DOCUMENTS

| | | | |
|---|---|---|---|
| 1,978,163 | 10/1934 | Megow | 264/61 |
| 3,290,186 | 12/1966 | Rosi et al. | 419/23 |
| 4,612,296 | 9/1986 | Sakamoto et al. | 501/93 |
| 4,640,816 | 2/1987 | Atzmon et al. | 419/24 |
| 4,761,129 | 8/1988 | Aste et al. | 425/133.1 |

FOREIGN PATENT DOCUMENTS

| | | | |
|---|---|---|---|
| 308812 | 12/1988 | Japan | 505/740 |
| 318020 | 12/1988 | Japan . | |

*Primary Examiner*—Peter A. Nelson
*Attorney, Agent, or Firm*—James W. Weinberger; Thomas G. Anderson; William R. Moser

[57] ABSTRACT

A process for extruding a superconducting metal oxide composition $YBa_2Cu_3O_{7-x}$ provides a wire (tube or ribbon) having a cohesive mass and a degree of flexibility together with enhanced electrical properties. Wire diameters in the range of 6–85 mils have been produced with smaller wires on the order of 10 mils in diameter exhibiting enhanced flexibility for forming braided, or multistrand, configurations for greater current carrying capacity. The composition for extrusion contains a polymeric binder to provide a cohesive mass to bind the particles together during the extrusion process with the binder subsequently removed at lower temperatures during sintering. The composition for extrusion further includes a deflocculent, an organic plasticizer and a solvent which also are subsequently removed during sintering. Electrically conductive tubing with an inner diameter of 52 mil and an outer diameter of 87–355 mil has also been produced. Flat ribbons have been produced in the range of 10–125 mil thick by 100–500 mil wide. The superconducting wire, tube or ribbon may include an outer ceramic insulating sheath co-extruded with the wire, tubing or ribbon.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

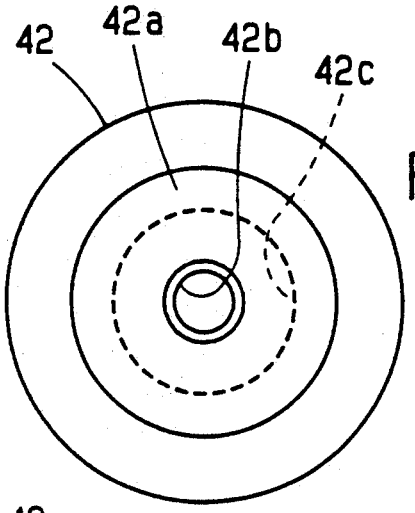
FIG. 4a
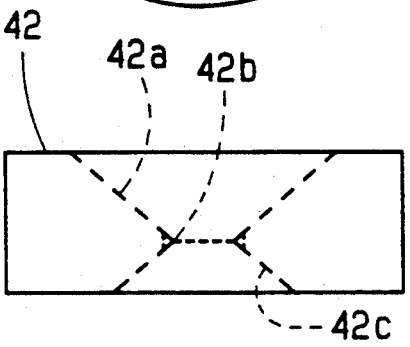
FIG. 4b
FIG. 5a
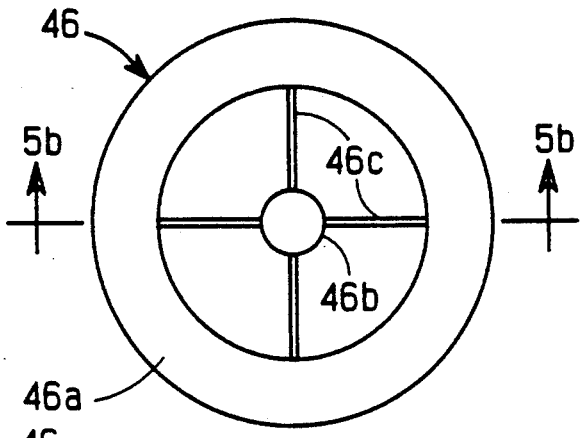
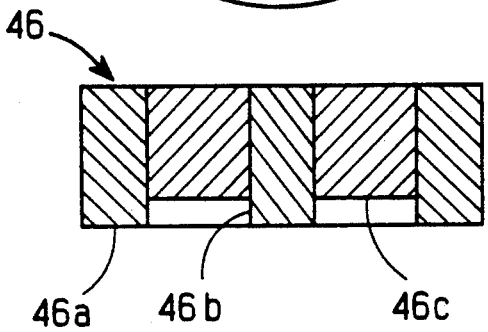
FIG. 5b
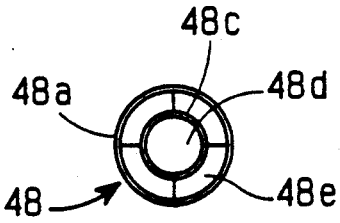
FIG. 7

EXTRUSION OF METAL OXIDE SUPERCONDUCTING WIRE, TUBE OR RIBBON

CONTRACTUAL ORIGIN OF THE INVENTION

This invention was made with Government support under Contract Number W-31-109-ENG-38 awarded by the U.S. Department of Energy. The Government has certain rights in the invention.

CROSS REFERENCE TO RELATED APPLICATION

This application is related to, but in no way dependent upon, co-pending application Ser. No. 101,818, filed Sep. 28, 1987.

BACKGROUND OF THE INVENTION

This invention relates generally to ceramic superconducting compositions and is particularly directed to a method and apparatus for extruding metal oxide ceramic superconducting compositions in the form of thin wires, tubes or ribbons.

Work has intensified on a new class of ceramics since the discovery several years ago that these materials exhibit superconductivity at unprecedented high temperatures. No longer is it required to maintain exotic materials at liquid helium temperatures to realize superconductivity. Ceramic metal oxide conductors have exhibited superconducting properties at temperatures as high as 125 K. It is of course desirable for a superconductor to have a high critical current density to allow it to conduct large currents while remaining superconductive. It is also highly desirable for the superconducting material to possess physical characteristics which facilitate its formation in commercially usable forms. Superconducting materials shaped into usable forms such as thin wires and strands are brittle, weak and of only limited flexibility. Attempts to produce very small diameter superconducting wires which are believed to be more flexible and could be combined in a larger braid or a multistrand arrangement for greater current carrying capacities have also met with only limited success.

The present invention addresses the aforementioned limitations of the prior art by providing apparatus and method for fabricating small diameter wires on the order of 10 mils having enhanced flexibility while retaining superconducting electrical properties at high temperatures. The present invention is directed to an extrusion process employing various die arrangements for forming a metal oxide ceramic comprised of $YBa_2Cu_3O_{7-x}$ into thin wires, tubes or ribbons.

OBJECTS AND SUMMARY OF THE INVENTION

Accordingly, it is an object of the present invention to form ceramic superconducting compositions in the shape of wires, tubes or ribbons.

It is another object of the present invention to provide a method and apparatus for extruding superconducting wire having a metal oxide composition consisting of a cohesive mass and providing a degree of flexibility and enhanced electrical properties.

A further object of the present invention is to provide an improved method and apparatus for fabricating braided, or multistrand, wires having a small diameter with enhanced flexibility and superconducting characteristics.

Yet another object of the present invention is to provide an improved method and apparatus for simultaneously extruding a superconducting material in the form of a thin wire as well as a second material in the form of an outer layer, coextending with the wire which may serve as an insulator.

A still further object of the present invention is to provide an improved method and apparatus for forming superconducting materials having relatively high transition temperatures into usable shapes such as wires that are relatively strong and not brittle.

Another object of the present invention is to form a superconducting wire or tube by extrusion having a metal oxide composition, such as $YBa_2Cu_3O_{7-x}$, and further including a deflocculent, an organic plasticizer, a binder and a solvent.

This invention contemplates apparatus and a process for producing an elongated wire or tube of a superconducting ceramic comprising the steps of: producing a cohesive material composed of particles of $YBa_2Cu_3O_{7-x}$, the sintered particles having a generally uniform particle size in the range of submicron to on the order of 40 microns, 1–8 wt. % of a deflocculent, 3–10 wt. % of an anhydrous plasticizer, 10–30 wt. % of a solvent, and 2–15 wt. % of a binder, the plasticizer and binder being soluble in the solvent; extruding the cohesive material through a wire-, tube- or ribbon-forming die to produce an elongated wire, tube or ribbon having a green stage density in the range of 45–58% theoretical density; and heating the wire, tube or ribbon in the green stage to volatilize the solvent and remove the plasticizer and binder at temperatures in the range of 240°–350° C., then the temperature for sintering is increased to 900°–950° C. for 3–24 hours, wherein the sintering is carried out in the presence of oxygen, and annealing the sintered YBahd $2Cu_3O_{7-x}$ in the presence of oxygen at a temperature in the range of 400°–500° C.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 4*a* and 4*b* are respectively top and side views of another embodiment of an extrusion die for use in carrying out the present invention;

FIGS. 5*a* and 5*b* are respectively top and side plan views of still another extrusion die for forming a metal oxide superconducting material in the shape of a tube;

FIG. 7 is an end-on plan view of an extrusion die for forming a metal oxide superconducting wire having an outer sheath in accordance with another embodiment of the present invention.

DETAILED DESCRIPTION OF THE PREFERRED EMBODIMENTS

Figure 1:
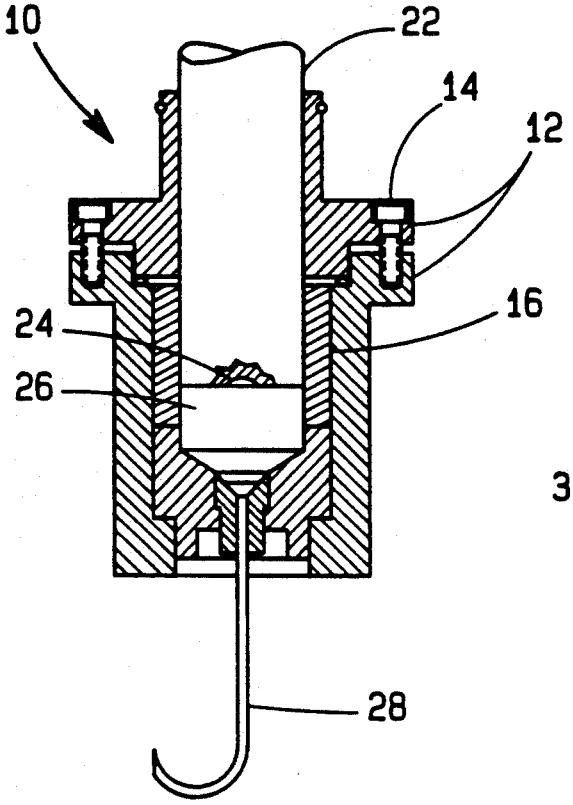
FIG. 1 is a sectional view of a prior art extrusion die for use in forming a metal oxide superconducting material in the form of a wire in accordance with the principles of the present invention.

This invention relates to a process and apparatus for extruding superconducting wire, tube or ribbon from metal oxide compositions under conditions which provide a cohesive mass, enhance the electrical properties of the wire, tube or ribbon and provide a superconductor in the form of either a wire or a ribbon with a high degree of flexibility. Wire diameters in the range of 6–85 mils have been produced with the smaller wires on the order of 10 mils in diameter having enhanced flexibility. Smaller wires on the order of 10 mils are more flexible and can be combined in a larger braid, or multistrand, for greater current carrying capacity. Also, hollow tubing with an inner diameter (ID) of 52 mil and an outer diameter (OD) of 87–355 mil has been produced. The composition for extrusion includes a polymeric binder to provide a cohesive mass to bind the particles together during the extrusion process with the binder being subsequently removed at lower temperatures during the sintering process. Additional ingredients described below are also present in the composition.

The extrusion process of the invention is directed to the general class of ceramic superconducting compositions. Work has been carried out primarily on $YBa_2Cu_3O_{7-x}$ superconductors with a representative formulation provided herein. It is important that this system is not an aqueous system because moisture degrades the superconducting material. An additional important factor is the uniformity and particle size of the composition. It is believed that small particle sizes are important for improved results and that uniform mixtures avoid problems in the sintering stage as well as provide improved physical characteristics. Particle sizes ranging from submicron to approximately 40 microns provide beneficial properties. The solid particles may be the product of calcining or may be particles of the oxides prior to calcining. The extrusion process may be carried out at room temperature, although other temperatures of the die may be used to improve flow characteristics of the mix.

Alignment of the crystalline particles affords greater current carrying capacities. This factor is improved by a die design which provides enhanced alignment of crystal orientation. A representative die is 4 inches in OD, 1½ inches in ID, and on the order of 6 inches in length and is used with a plunger-type press having a gear reduction of a 20 ton ball screw actuator to provide flow rate and pressure control necessary for extrusion. Extrusion pressures of from 800 pounds to 25,000 pound load have been used in fabricating extruded superconductors in accordance with the present invention. These pressures may vary with orifice size of the extrusion die.

Orifice designs are generally dependent on the size of wire, tube or ribbon extruded, the production of straight wire, ribbon or coil, and other production factors. Generally, longer orifice lengths are associated with larger wire sizes and provide wire lengths sufficient to promote particle orientation in the extruded product. For coiled products, the orifice exit may have an angled opening, or a hook-like curve, to facilitate natural coiling of the extruded product.

The sintering temperature is also important because an excessive temperature can degrade the superconducting material. The use cf small particles of a generally uniform size in the sintering process avoids the formation of glass as well as excessive localized reaction which may form glass-like materials. This invention contemplates not only the extrusion of a metal oxide superconducting material either in the form of a wire, tube or ribbon but also may be used for the extrusion of a superconducting material together with a second material forming an outer layer for the superconducting material which may be a ceramic insulator in a co-extrusion process. The outer layer is also preferably a ceramic-based material capable of withstanding the high temperatures of sintering, while permitting oxygen introduction via annealing.

Referring to FIG. 1, there is shown a lateral sectional view of a prior art extrusion die 10 for carrying out the principles of the present invention in forming a metal oxide superconductor in the form of a wire, tube or ribbon. The extrusion die 10 includes a die body 12 having upper and lower portions coupled together by one or more capscrews 14. Disposed within a lower portion of the extrusion die 10 is a filler sleeve 16 within which is disposed the material to be extruded 24 as well as a movable ram 22. Downward displacement of the ram 22 forces the material for extrusion 24 out of an aperture in a lower portion of the die member 26 and through a forming tube 28. The extruded material exiting the forming tube 28 may be wound on a mandrel (not shown) in forming a braided or multistrand superconductor.

Figure 2A:
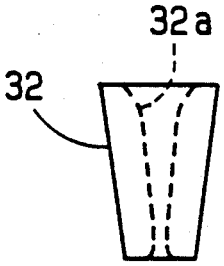
FIGS. 2*a* and 2*b* are side views shown in phantom of a die and die holder, respectively, for use in the extrusion die of FIG. 1.
Figure 2B:
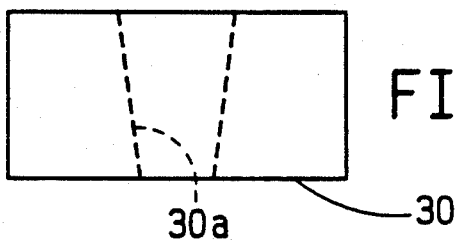

Referring to FIGS. 2*a* and 2*b*, there are respectively shown side views partially in phantom of a die holder 30 and a die insert 32 for use in one embodiment of the present invention in forming a metal oxide superconducting wire. The die holder 30 has a generally circular inner slot 38 tapered from top to bottom. The die holder receiving slot 30*a* is adapted to receive a complementary die insert 32 also having a generally circular cross section with a taper from top to bottom. The die holder 30 may have virtually any cross sectional shape, with a circular cross section being preferred. Disposed within and extending the length of the die insert 32 is an elongated aperture 32*a*. Upper and lower ends of the die insert aperture 32*a* are chamfered to reduce the drag, or pull, on the metal oxide composition during extrusion. The chamfered entrance and exit portions of the die insert aperture 32*a* provide the extruded wire with a high degree of surface smoothness and reduce the possibility of tearing the thus extruded wire.

Figure 3A:
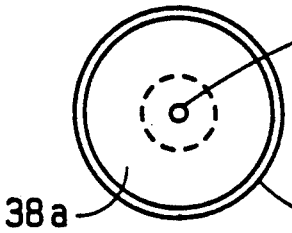
FIGS. 3*a*, 3*b* and 3*c* are respectively top and side views of a die and a side view of a die holder for use in carrying out another embodiment of the present invention.
Figure 3B:
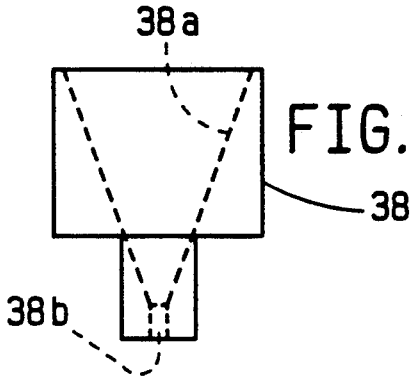
Figure 3C:
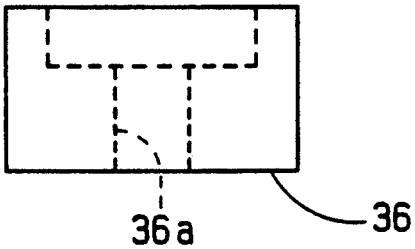

Referring to FIGS. 3*a* and 3*b*, there are respective top and side plan views of another embodiment of a die insert 38 for use in extruding a metal oxide superconducting wire in accordance with the present invention. FIG. 3C is a lateral view shown partially in phantom of a die holder 36 for use with the die insert 38 shown in FIGS. 3*a* and 3*b*. The die holder 36 includes an upper recessed portion and a lower slot 36*a* extending through the die holder. The die holder slot 36*a* is adapted to receive a lower, generally cylindrical portion of the die insert 38 and provides support for the die insert. The die insert 38 includes a slot extending therethrough having an upper tapered inlet portion 38*a* and a lower outlet portion 38*b*. Metal oxide superconducting material deposited in the upper tapered inlet portion 38*a* of the die insert's aperture is extruded out of the lower outlet portion 38b of the aperture by means of a moveable ram (not shown in the figures for simplicity).

Referring to FIGS. 4a and 4b, there are respectively shown top and side plan views of another embodiment of a die insert 42 for use in carrying out the principles of the present invention. The die insert 42 is adapted for use with a die holder 36 such as shown in FIG. 3c having an upper, inner circular recessed portion adapted to receive in tight fitting engagement and provide support for the die insert. The die insert 42 includes an aperture extending therethrough having an inwardly tapered upper portion 42a and an outwardly tapered lower portion 42c. The inwardly tapered upper portion 42a and the outwardly tapered lower portion 42c of the die insert aperture intersect to form an inner lip 42b around the aperture. The die insert inner lip 42b defines that portion of the die insert aperture having the smallest diameter. In a preferred embodiment, the inner lip 42b is comprised of a diamond tipped ring disposed on the inner portion of the die insert 42.

Referring to FIG. 5a, there is shown a die insert 46 for use in forming a metal oxide superconducting tube in accordance with another embodiment of the present invention. A sectional view of the die insert 46 of FIG. 5a taken along site line 5b-5b is shown in FIG. 5b. The die insert 46 includes a generally cylindrical outer portion 46a and a generally cylindrical inner portion 46b. The inner portion 46b is disposed within in a spaced manner from the outer portion 46a and extends the length thereof. A plurality of radial support ribs 46c connect the outer and inner portions 46a and 46b of the die insert 46. The spaces intermediate adjacent support ribs 46c allow the extruded metal oxide superconducting material to pass intermediate the outer and inner portions 46a, 46b of the die insert 46. Following extrusion through the die insert 46, the metal oxide superconducting material comes together again after flowing past the support ribs 46c. The die insert 46 permits metal oxide superconducting tubes with an ID on the order of 52 mil and an OD on the order of 87-355 mil to be extruded in accordance with the present invention.

Figure 6:
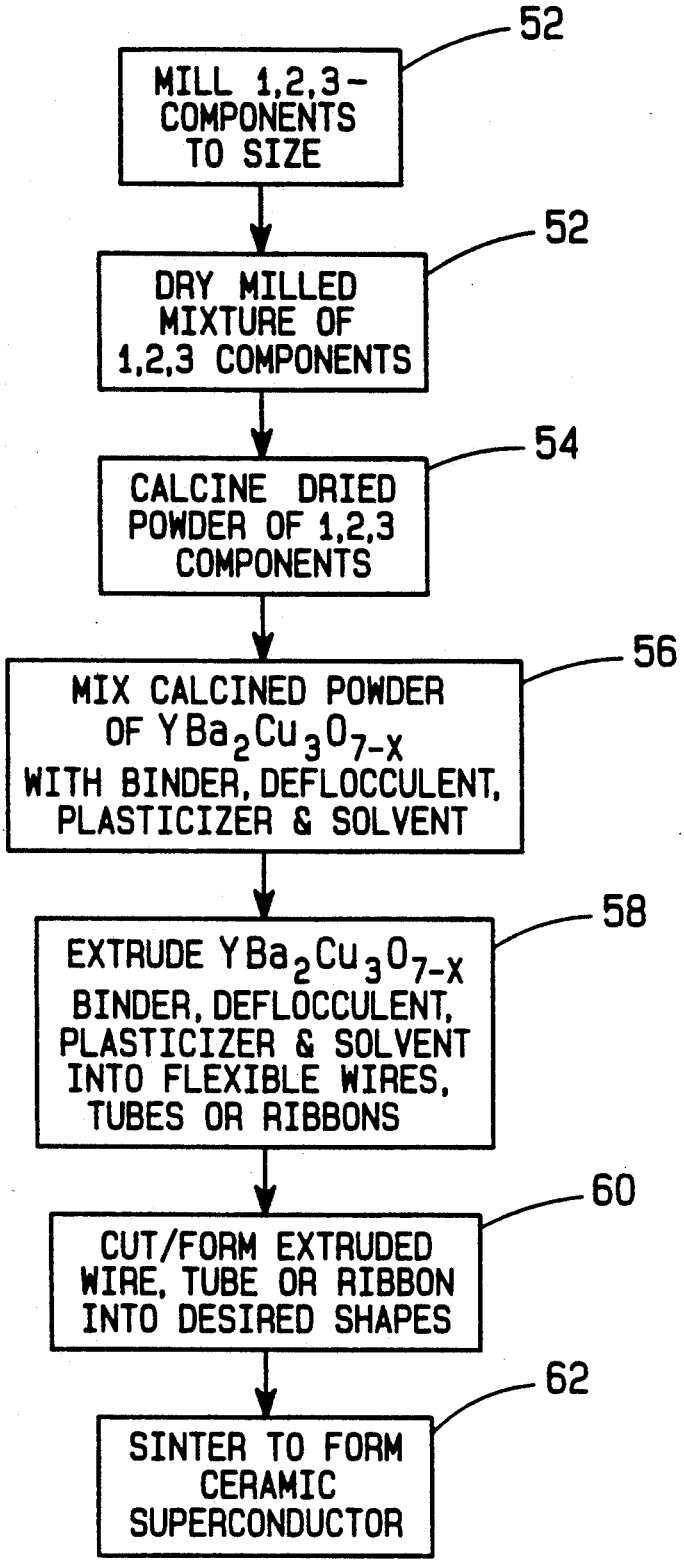
FIG. 6 is a flow chart illustrating the steps in carrying out a process for forming a metal oxide superconducting wire or tube in accordance with the principles of the present invention.

Referring to FIG. 6, there is shown a flow chart listing the various steps involved in carrying out the extrusion of a metal oxide superconducting material in the form of a wire, tube or ribbon in accordance with the present invention. The superconductor fabrication process starts at step 50 where the 1,2,3-components of a $Y_1Ba_2Cu_3O_{7-x}$ powder are milled down to particle sizes in the range of 74 microns to sub-micron sizes. Conventional milling techniques may be used to reduce the 1,2,3 powder components to the desired particle size. At step 52, the reduced 1,2,3 component powder particles are dried at an elevated temperature. The dried powder particles are then calcined at step 54 by heating to a temperature in the range of 900°-950° C. for 12 to 48 hours for driving off moisture and reducing the 1,2,3-superconductor. The calcining program is typically carried out by heating the 1,2,3 component powder for four to six hours at 500° C. followed by heating for 12 to 48 hours at 900°-950° C. in a flowing oxygen atmosphere, followed by slow cooling of the superconducting powder particles to room temperature.

The superconducting powder is then pressed with a binder, deflocculent, plasticizer and solvent at step 56. The binder is preferably of the acrylic type consisting of a thermosetting resin of the hydroxyl type containing a nitrogen resin cross linker and comprises 2-15 wt. % of the mixture. A typical plasticizer for use in the present invention is butyl benzyl phthalate ($C_{19}H_{20}O_4$) and preferably comprises 3-10 wt. % of the mixture. A deflocculent, such as Z3 fish oil, is added to the superconducting powder at this point and preferably comprises 1-8 wt. % of the mixture. The mixture also includes a solvent (10-30 wt. %) such as comprised of 78% xylene and 22% butyl alcohol. The mixture preferably has a viscosity on the order of 1,700-80,000 Poise at room temperatures, i.e., 20°-29° C. At step 58, the $Y_1Ba_2Cu_3O_{7-x}$ powder, binder, plasticizer and deflocculent are extruded into a flexible/deformable green shape in the form of a wire, tube or ribbon at step 58. The combination is subjected to extrusion pressure at the range of 500-27,500 pound load. The green extrude wire, tube or ribbon having a density in the range of 45-58% theoretical density is then cut or formed into the desired shape at step 60. The thus formed green wire, tube or ribbon is then sintered at step 62 for the purpose of burning out the binder, deflocculent, plasticizer and solvent by sintering the superconductor at elevated temperatures in a flowing oxygen atmosphere and converting to a superconducting ceramic material. In a preferred embodiment, the sintering and burnout cycle is comprised of heating the superconductor for 72 hours at 350° C.; for 6 hours and 40 minutes to a temperature in the range of 900°-960° C. for 3 to 48 hours; 6 to 48 hours at 400°-500° C.; followed by a reduction of the temperature to 200° C. and removal of the superconducting wire, tube or ribbon from the furnace.

The present invention also contemplates the co-extrusion of a metal oxide superconducting wire, tube or ribbon and an outer insulating layer using a die insert 48 such as shown in the end-on view of FIG. 7. The die insert 48 includes an outer tube 48a concentrically disposed about an inner tube 48c. A $Y_1Ba_2Cu_3O_{7-x}$ superconducting wire is extruded through the center aperture 48d defined by the inner tube 48c, while an outer insulating layer may be simultaneously co-extruded via the outer, concentric aperture 48e defined by the outer and inner tubes. A ceramic insulating material may be used to encapsulate the inner superconducting wire.

There has thus been shown apparatus and method for producing an elongated wire, tube or ribbon of a superconducting ceramic material such as comprised of $YBa_2Cu_3O_{7-x}$ by extruding the superconducting particles in a mixture containing a deflocculent, an organic plasticizer, a solvent and a binder. Wire diameters in the range of 6-85 mils have been produced with smaller wires on the order of 10 mils in diameter exhibiting enhanced flexibility for forming braided, or multistrand, configurations for greater current carrying capacity. Electrically conductive tubing with an inner diameter of 52 mil and an outer diameter 87-355 mil has also been produced. The superconducting wire, tube or ribbon may be co-extruded with an outer insulating sheath which may also be comprised of a ceramic material.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A method for producing an elongated wire, tube or ribbon of a superconducting ceramic comprising the steps of:

producing a cohesive material composed of particles of $YBa_2Cu_3O_{7-x}$, said particles having a generally uniform size with particles in the range of submicron to on the order of 40 microns, 1–8 wt. % of a deflocculent, 3–10 wt. % of an anhydrous plasticizer, 10–30 wt. % of a solvent, and 2–15 wt. % of a binder, said plasticizer and binder being soluble in the solvent;

extruding said cohesive material through a wire-, tube- or ribbon-forming die to produce an elongated wire, tube or ribbon having a green stage density in the range of 45–58% theoretical density;

extruding an outer sheath of a ceramic insulating material about the elongated wire, tube or ribbon as the wire, tube or ribbon is extruded;

heating the wire, tube or ribbon in the green stage to volatilize the solvent and remove the plasticizer and binder at temperatures below approximately 240°–350° C.;

sintering the $YBa_2Cu_3O_{7-x}$ at temperatures in the order of 900°–960° C., wherein said sintering is carried out in the presence of oxygen; and annealing the sintered $YBa_2Cu_3O_{7-x}$ in the presence of oxygen at a temperature in the range of 400°–500° C.

2. The method of claim 1 further comprising the step of forming a plurality of elongated wires or ribbons into a braided, multistrand conductor.

3. The method of claim 1 further comprising the step of providing the cohesive material with a viscosity in the range of 1,700–80,000 Poise.

4. The method of claim 1 wherein the step of extruding said cohesive material includes applying an extrusion pressure in the range of 800–25,000 pound load.

* * * * *